C. H. HERSEY.
Apparatus for Drying Sugar, &c.
No. 149,397. Patented April 7, 1874.
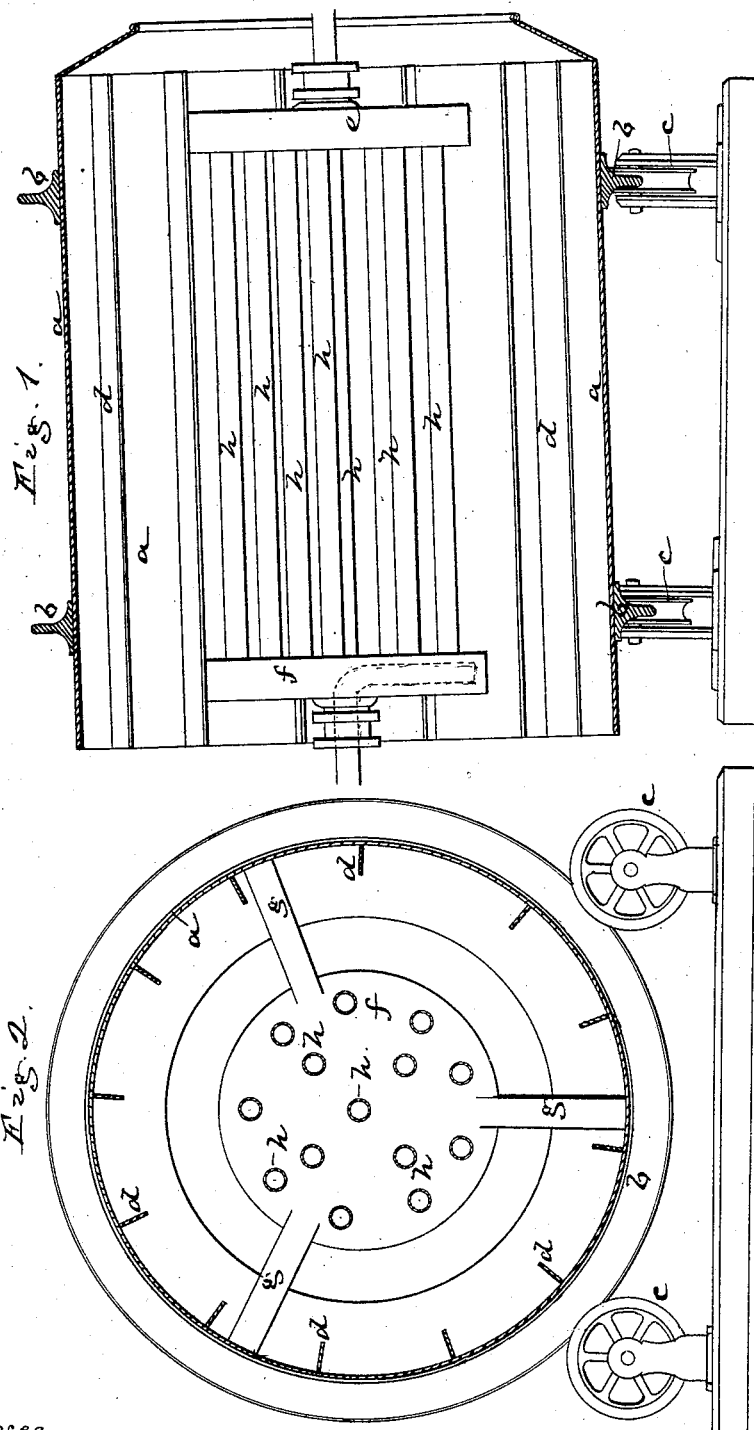

UNITED STATES PATENT OFFICE.

CHARLES H. HERSEY, OF BOSTON, MASSACHUSETTS.

IMPROVEMENT IN APPARATUS FOR DRYING SUGAR, &c.

Specification forming part of Letters Patent No. 149,397, dated April 7, 1874; application filed July 24, 1873.

*To all whom it may concern:*

Be it known that I, CHARLES H. HERSEY, of Boston, in the county of Suffolk and State of Massachusetts, have invented an Improved Apparatus for Drying Sugar, &c.; and I do hereby declare that the following, taken in connection with the drawings which accompany and form part of this specification is a description of my invention sufficient to enable those skilled in the art to practice it.

United States Letters Patent No. 114,137, dated April 25, 1871, have been granted to me for an improved drying apparatus, and in such patent, I show an open-ended drier-drum, through which the material to be dried passes, and centrally within this drum a heater-cylinder, through which steam is passed to heat the air between it and the shell of the drier-cylinder, the heater-cylinder and drier-drum being connected so as to move together, and the outer cylinder being provided with rims or rings, that rest and turn upon friction-wheels.

My present apparatus differs from such patented mechanism, principally, in that I employ, instead of the steam-heater cylinder, a series of steam tubes, assembled centrally within the drier-drum, parallel to the axis thereof, and extending from one steam-head to another, steam entering the center of one head, and thence passing through the several pipes into and through the other head.

My invention consists in the combination, with the main cylinder, of the tubes arranged within the same, and extending between the two steam-heads.

The drawing represents an apparatus embodying my construction.

Figure 1 shows the pipes in side elevation, and the main cylinder in section. Fig. 2 is a vertical cross-section of the cylinder and pipes.

*a* denotes the main drier-cylinder or shell, provided with rims or tires *b*, which rest and turn on wheels *c*. Extending from the inner surface of this cylinder are shelves *d*, for taking up and dropping the material as the cylinder rotates. Arranged centrally within the cylinder are the two steam-heads *e f*, which are supported within the cylinder by spokes or arms *g*, that fixedly connect them with the cylinder, so that they become in effect a part thereof. Into one of these heads steam is let, and from the other steam escapes, and leading from one drum to the other are the several steam pipes or tubes *h*. Steam being let into one of the heads, passes through the tubes and keeps them heated, and the heat radiating from the outer surface heats the air passing through the cylinder and the material, the material being heated and dried both by the contact of the air and by contact with the pipes, the material falling from one side of the chamber to the opposite side, and upon the pipes *h*, and by constant contact and motion being rapidly dried, the cylinder being so inclined that as it rotates the material moves progressively through the chamber from the end which it enters to the opposite end where it is discharged.

I claim—

A drying apparatus in which, within the main shell or drier cylinder *a*, are the steam-heater pipes *h*, extending between the two heads *e f*, the construction and arrangement being substantially as shown and described.

CHAS. H. HERSEY.

Witnesses:
FRANCIS GOULD,
M. W. FROTHINGHAM.